(12) United States Patent
Gustafsson et al.

(10) Patent No.: US 11,687,673 B2
(45) Date of Patent: Jun. 27, 2023

(54) ACTOR MIGRATION

(71) Applicant: Telefonaktiebolaget LM Ericsson (publ), Stockholm (SE)

(72) Inventors: Harald Gustafsson, Lund (SE); Hakan Englund, Lund (SE); Christoffer Jerkeby, Tyresö (SE); Bernard Smeets, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 397 days.

(21) Appl. No.: 16/940,828

(22) Filed: Jul. 28, 2020

(65) Prior Publication Data

US 2020/0356698 A1 Nov. 12, 2020

Related U.S. Application Data

(62) Division of application No. 16/075,452, filed as application No. PCT/EP2016/052362 on Feb. 4, 2016, now Pat. No. 11,080,428.

(51) Int. Cl.
*G06F 21/62* (2013.01)
*G06F 9/48* (2006.01)
*G06F 21/60* (2013.01)

(52) U.S. Cl.
CPC ........ *G06F 21/6281* (2013.01); *G06F 9/4856* (2013.01); *G06F 21/604* (2013.01)

(58) Field of Classification Search
CPC ... G06F 21/6281; G06F 9/4856; G06F 21/604
See application file for complete search history.

(56) References Cited

U.S. PATENT DOCUMENTS

| | | |
|---|---|---|
| 9,027,143 B1 | 5/2015 | Agrawal et al. |
| 2002/0129126 A1 | 9/2002 | Chu et al. |
| 2003/0037327 A1 | 2/2003 | Cicciarelli |
| 2008/0046960 A1 | 2/2008 | Bade et al. |
| 2011/0099548 A1 | 4/2011 | Shen et al. |

(Continued)

FOREIGN PATENT DOCUMENTS

| | | |
|---|---|---|
| CN | 101937357 A | 1/2011 |
| CN | 105718246 A | 6/2016 |

(Continued)

OTHER PUBLICATIONS

Carl Hewitt, Actor Model of Computation: Scalable Robust Information Systems, pp. 1-75.

(Continued)

*Primary Examiner* — Mohammad W Reza
(74) *Attorney, Agent, or Firm* — Leffler Intellectual Property Law, PLLC

(57) ABSTRACT

A method and a corresponding runtime environment for migrating an instance of an actor of an application are provided. An initiating runtime environment performs a method comprising selecting, based on obtained security attributes for a set of target runtime environments, a target runtime environment from the set of target runtime environments for migration of the instance of the actor. The method comprises migrating the instance of the actor to the selected target runtime environment once the target runtime environment has been selected.

14 Claims, 5 Drawing Sheets

(56) References Cited

U.S. PATENT DOCUMENTS

| | | | | |
|---|---|---|---|---|
| 2012/0216244 A1* | 8/2012 | Kumar | ............... | G06F 21/57 726/1 |
| 2014/0237576 A1* | 8/2014 | Zhang | ............... | G06F 21/32 726/7 |
| 2014/0366084 A1 | 12/2014 | Ogawa | | |
| 2015/0269383 A1 | 9/2015 | Lang et al. | | |
| 2016/0248810 A1* | 8/2016 | Majaniemi | ............ | H04L 63/20 |

FOREIGN PATENT DOCUMENTS

| | | | |
|---|---|---|---|
| EP | 1927956 A1 | 6/2008 | |
| JP | 2003233521 A | 8/2003 | |
| JP | 2007293873 A | 11/2007 | |
| JP | 2012038029 A | 2/2012 | |
| JP | 2014232468 A | 2/2014 | |
| JP | 2014232468 A | 12/2014 | |
| RU | 2439690 C2 | 1/2012 | |
| WO | 2013111532 A1 | 8/2013 | |
| WO | WO-2013161212 A1 * | 10/2013 | ............ H04L 63/20 |
| WO | 2015005936 A1 | 1/2015 | |
| WO | 2015127461 A1 | 8/2015 | |

OTHER PUBLICATIONS

Zhe Chen et al., Formal Semantics of Runtime Monitoring, Verification, Enforcement and Control, 2015 International Symposium on Theoretical Aspects of Software Engineering, pp. 63-70.

Per Persson et al., 6th International Conference on Ambient Systems, Networks and Technologies, ANT 2015 and the 5th International Conference on Sustainable Energy Information Technology, SEIT 2015, Calvin—Merging Cloud and IoT, SciVerse ScienceDirect, Procedia Computer Science 2015, pp. 1-8.

G. Selander et al., Object Security of CoAP (OSCOAP) draft-selander-ace-object-security-03, ACE Working Group, Internet Draft, Oct. 19, 2015, pp. 1-42.

PCT International Search Report, dated Jul. 22, 2016, in connection with International Application No. PCT/EP2016/052362, 3 pages.

PCT Written Opinion, dated Jul. 22, 2016, in connection with International Application No. PCT/EP2016/052362, 5 pages.

Russian Office Action, dated May 29, 2019, in connection with Russian Application No. 2018131367/08, 10 pages.

English language translation of Russian Office Action, dated May 29, 2019, in connection with Russian Application No. 2018131367/08, 7 pages.

Russian Search Report, completed May 27, 2019, in connection with Russian Application No. 2018131367/08, 2 pages.

Japanese Office Action dated Sep. 2, 2019 in connection with Japanese Application No. 2018-538165, 4 pages.

English language summary of Japanese Office Action dated Sep. 2, 2019 in connection with Japanese Application No. 2018-538165, 3 pages.

Chinese Office Action dated Apr. 8, 2021 in connection with Chinese Application No. 201680080873.5, 9 pages.

* cited by examiner

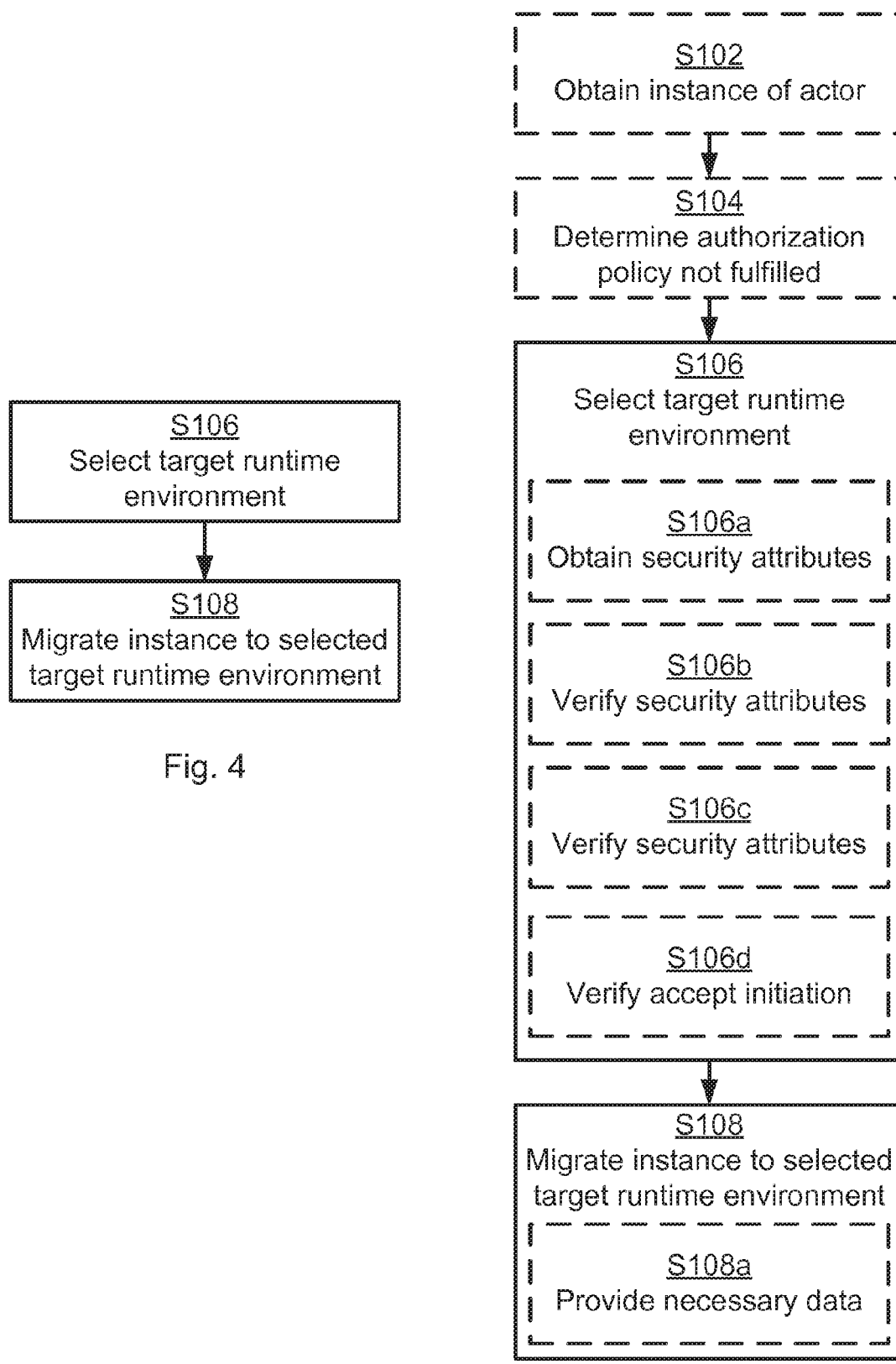

ACTOR MIGRATION

CROSS-REFERENCE TO RELATED APPLICATIONS

This application claims the benefit of U.S. application Ser. No. 16/075,452, filed Aug. 3, 2018 (371(c) date), which is a 35 U.S.C. § 371 national stage of international application PCT/EP2016/052362 filed Feb. 4, 2016. All of these earlier applications are hereby incorporated herein by reference in their entireties.

TECHNICAL FIELD

Embodiments presented herein relate to methods, runtime environments, computer programs, and a computer program product for migrating an instance of an actor of an application.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to distribute an application between at least two runtime environments in the communications network.

Hence, a runtime environment can allow application modules, denoted actors, to be deployed distributed over several devices (each device comprising a runtime environment). In general terms, actors can be regarded as parts of a distributed application that communicate with messages, see http://arxiv.org/abs/1008.1459 (as accessed on 29 Jan. 2016). Actors have conditions to guide placement of an instance of the actor on a runtime environment. Runtime environments have attributes that describe the runtime environment functionality as well as other information. Current implementations of runtime environments in the communications network to handle distributed applications lack support for security.

An environment where software components, such as applets, can be moved into a runtime environment is Java. Java provides runtime security for applets. According to the Java framework the applets are signed (along with access permissions) and the runtime environment will verify the applets and permissions before execution is commenced. However the Java framework does not allow applets to verify the trustworthiness of the runtime beyond the requirement of the possession of the certificate with the public key needed for the applet signature.

Hence, there is a need for an improved handling of distributed applications on runtime environments.

SUMMARY

An object of embodiments herein is to provide handling of distributed applications on runtime environments.

According to a first aspect there is presented a method for migrating an instance of an actor of an application. The method is performed by an initiating runtime environment. The method comprises selecting, based on obtained security attributes for a set of target runtime environments, a target runtime environment from the set of target runtime environments for migration of the instance of the actor. The method comprises migrating the instance of the actor to the selected target runtime environment once having selected the target runtime environment.

According to a second aspect there is presented a runtime environment acting as an initiating runtime environment for migrating an instance of an actor of an application. The runtime environment comprises processing circuitry. The processing circuitry is configured to cause the runtime environment to select, based on obtained security attributes for a set of runtime environments acting as target runtime environments, a runtime environment acting as a target runtime environment from the set of runtime environments acting as target runtime environments for migration of the instance of the actor. The processing circuitry is configured to cause the runtime environment to migrate the instance of the actor to the selected runtime environment acting as target runtime environment once having selected the runtime environment acting as target runtime environment.

According to a third aspect there is presented a runtime environment acting as an initiating runtime environment for migrating an instance of an actor of an application. The runtime environment comprises a select module configured to select, based on obtained security attributes for a set of runtime environments acting as target runtime environments, a runtime environment acting as a target runtime environment from the set of runtime environments acting as target runtime environments for migration of the instance of the actor. The runtime environment comprises a migrate module configured to migrate the instance of the actor to the selected runtime environment acting as target runtime environment once having selected the runtime environment acting as target runtime environment.

According to a fourth aspect there is presented a computer program for migrating an instance of an actor of an application, the computer program comprising computer program code which, when run on processing circuitry of a runtime environment acting as an initiating runtime environment, causes the runtime environment to perform a method according to the first aspect.

According to a fifth aspect there is presented a method for migrating an instance of an actor of an application. The method is performed by a target runtime environment. The method comprises identifying security attributes that enable an initiating runtime environment to select the target runtime environment for migration of the instance of the actor. The method comprises obtaining data necessary to instantiate the instance of the actor from the initiating runtime environment based on the identified security attributes. The method comprises instantiating the instance of the actor when an authorization policy of the target runtime environment for the instance of the actor is fulfilled, thereby allowing the instance of the actor access to at least one resource object.

According to a sixth aspect there is presented a runtime environment acting as a target runtime environment for migrating an instance of an actor of an application, the runtime environment comprising processing circuitry. The processing circuitry is configured to cause the runtime environment to identify security attributes that enable a runtime environment acting as an initiating runtime environment to select the target runtime environment for migration of the instance of the actor. The processing circuitry is configured to cause the runtime environment to obtain data necessary to instantiate the instance of the actor from the runtime environment acting as initiating runtime environment based on the identified security attributes. The processing circuitry is configured to cause the runtime environment to instantiate the instance of the actor when an authorization policy of the runtime environment acting as target runtime environment for the instance of the actor is fulfilled, thereby allowing the instance of the actor access to at least one resource object.

According to a seventh aspect there is presented a runtime environment acting as a target runtime environment for migrating an instance of an actor of an application. The runtime environment comprises an identify module configured to identify security attributes that enable a runtime environment acting as an initiating runtime environment to select the target runtime environment for migration of the instance of the actor. The runtime environment comprises an obtain module configured to obtain data necessary to instantiate the instance of the actor from the runtime environment acting as initiating runtime environment based on the identified security attributes. The runtime environment comprises an instantiate module configured to instantiate the instance of the actor when an authorization policy of the runtime environment acting as target runtime environment for the instance of the actor is fulfilled, thereby allowing the instance of the actor access to at least one resource object.

According to an eighth aspect there is presented a computer program for migrating an instance of an actor of an application, the computer program comprising computer program code which, when run on processing circuitry of a runtime environment acting as a target runtime environment, causes the runtime environment to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium can be a non-transitory computer readable storage medium.

Advantageously these methods, these runtime environments, and these computer programs provide efficient migration of the instance of the actor.

Advantageously these methods, these runtime environments, and these computer programs enable secure migration of an actor of a distributed application. Such secure migration of an actor of a distributed application in turn enables efficient handling of distributed applications on runtime environments.

It is to be noted that any feature of the first, second, third, fourth, fifth, sixth, seventh, eighth, and ninth aspects may be applied to any other aspect, wherever appropriate. Likewise, any advantage of the first aspect may equally apply to the second, third, fourth, fifth, sixth, seventh, eighth, and/or ninth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 4, 5, 6, and 7 are flowcharts of methods according to embodiments.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
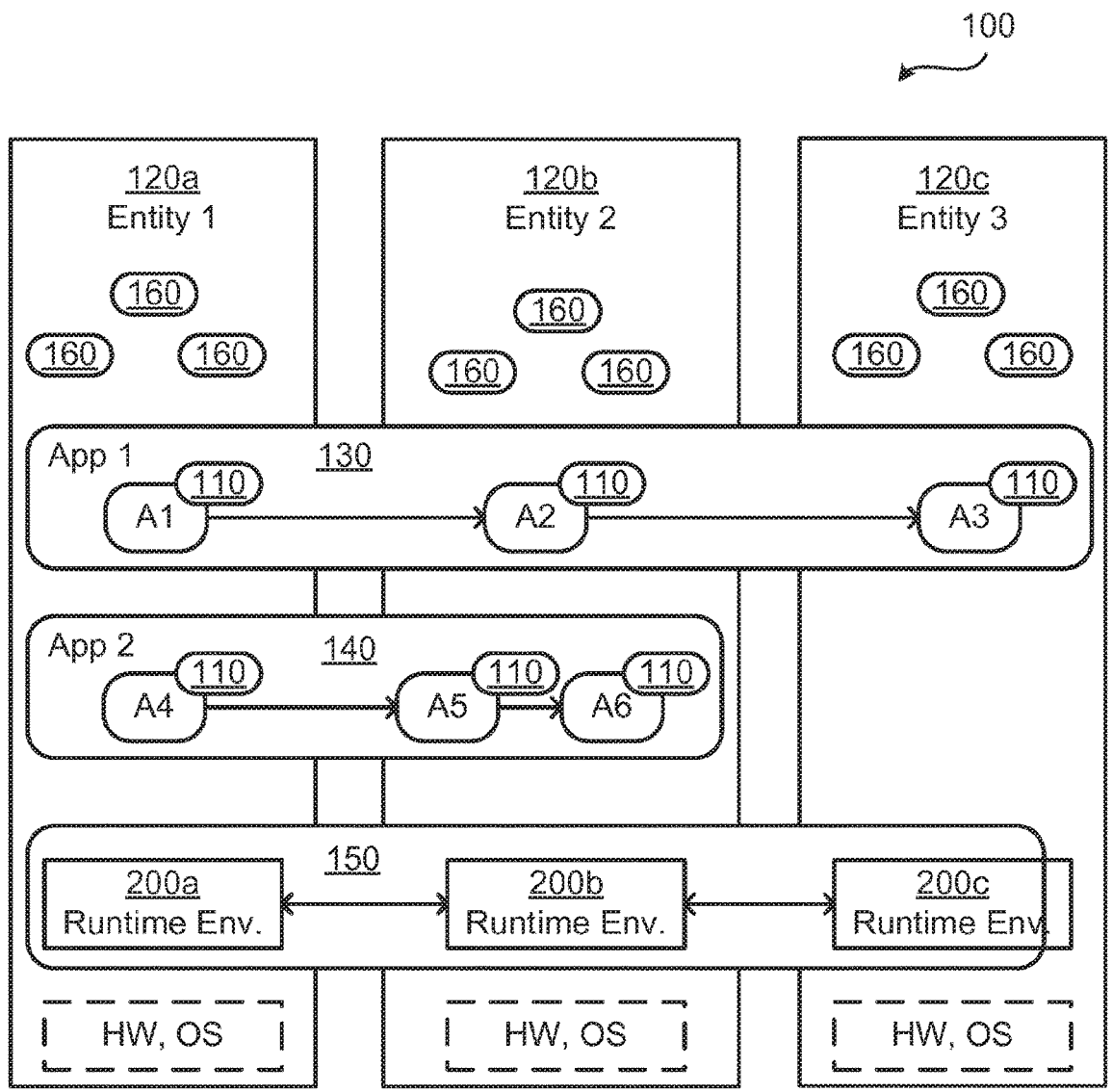
FIG. 1a is a schematic diagram illustrating a communications network according to embodiments.

FIG. 1a schematically illustrates a communications network 100. The communications network 100 comprises three entities (Entity 1, Entity 2, Entity 3) 120a, 120b, 120c, representing any combination of devices, compute nodes, and storage nodes. Each entity 120a, 120b, 120c may have its own hardware (HW) and may have its own operating system (OS). Alternatively, hardware and/or operating system is shared among at least two of the entities 120a, 120b, 120c.

The entities 120a, 120b, 120c host a first application (App 1) 130 and a second application (App 2) 140, each of which is distributed among the entities 120a, 120b, 120c. The applications 130, 140 are transparently distributed across the communications network 100 and comprises actors (A1, A2, A3, A4, A5, A6). There is not a one-to-one mapping between actors A1, A2, A3, A4, A5, A6 and entities 120a, 120b, 120c. For example, in the illustrative example of FIG. 1a, actors A5 and A6 both reside on the same entity 120b (i.e., Entity 2). The actors (A1, A2, A3, A4, A5, A6) may access a resource object 160 by means of at least one of the runtime environments 200a, 200b, 200c. Each resource object 160 could be a file system, a sensor, an actuator, a network interface, etc., that access is provided to by the runtime environments 200a, 200b, 200c.

The communications network 100 further comprises a distributed execution environment 150 formed by a set of network of runtime environments 200a, 200b, 200c, seen by the applications 130, 140 as a single platform.

Each actor A1, A2, A3, A4, A5, AG can be run as one or more instances 110. The embodiments disclosed herein relate to mechanisms for migrating an instance 110 of an actor of an application. In order to obtain such mechanisms there is provided a runtime environment 200a, 200b, 200c acting as an initiating runtime environment and/or as a target runtime environment, a method performed by the runtime environment 200a, 200b, 200c, a computer program product comprising code, for example in the form of a computer program, that when run on processing circuitry of the runtime environment 200a, 200b, 200c, causes the runtime environment 200a, 200b, 200c to perform the method.

In general terms, an actor or an instance 110 of an actor can be viewed as any of a collection of data such as executable, state, deployment conditions and credentials. In this respect, only the instance may be considered to have a state whereas the actor may be regarded as being stateless. Conceptually, the deployment conditions and credentials can be separate and applied on the actor by the entity initiating the instantiation or execution of the actor. Some deployment conditions relate to specific security attributes for target runtime environments instances of the actors are allowed being migrated (pushed or instantiated) to. Each instance of an actor has the required values of the security attributes which for simplicity are referred to as the security conditions.

An instance of an actor can have application attributes and potentially actor specific security attributes. Examples of such attributes will be summarized next.

Target runtime policy are conditions on resource attributes and values e.g. secure personal identification number (PIN) code available, secure user interface, secure boot, etc. being available at the target runtime environment.

Deployment credentials are security attributes applied to the instance of the actor under which it will operate, e.g. role, username and password, domain certificate, application certificate, etc. Deployment credentials could be application user credentials. Deployment credentials could be the credentials of the runtime environment initiating migration of an instance of the actor. Although named deployment credentials this does not incur any limitation in time when the credentials are supplied; the deployment credentials can also be supplied before deployment or after deployment.

Actor credentials are attributes of the instance of the actor, e.g. signatures. An example of actor credentials is a developer signature of an actor, and the corresponding certificates certifying the credentials used for the signature.

The runtime environment can have runtime security attributes. Examples of such attributes will be summarized next.

Actor policies are conditions with a given actor's deployment and actor credentials on requirements or runtime environments on actor signature.

Runtime credentials are security attributes of the runtime environment currently hosting an instance of the actor and could be domain certificates, entity certificates, passwords, secret or public keys, or non-certificate based PKI structures like Web of Trust.

Resource objects 160 (see below) can have security attributes. Examples of such attributes will be summarized next.

Access policies are conditions with an actor instance and the actor credentials rights, the deployment credentials rights, and the runtime credentials rights to the resource objects 160.

Figure 6:
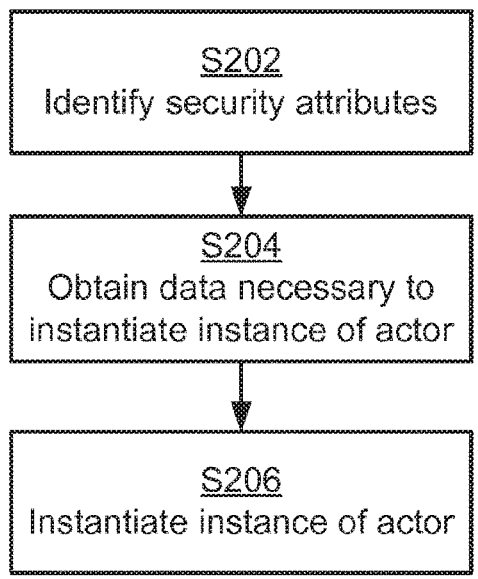
Figure 7:
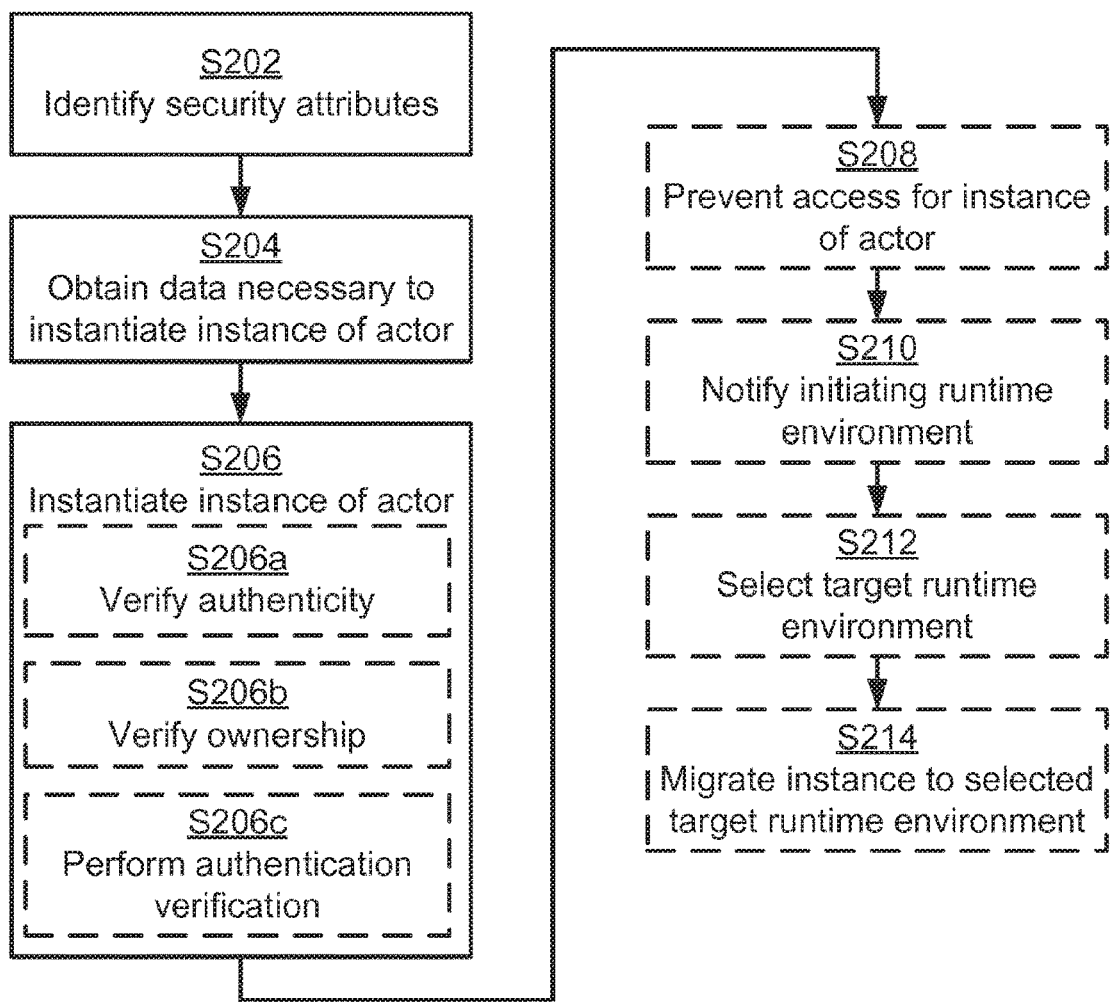

FIGS. 4 and 5 are flow charts illustrating embodiments of methods for migrating an instance 110 of an actor of an application as performed by the runtime environment 200a acting as an initiating runtime environment. FIGS. 6 and 7 are flow charts illustrating embodiments of methods for migrating an instance 110 of an actor of an application as performed by the runtime environment 200b acting as a target runtime environment. The methods are advantageously provided as computer programs 320a, 320b, see below.

At least some of the herein disclosed embodiments are based on an initiating runtime environment 200a migrating an instance 110 of an actor to a target runtime environment 200b whilst enforcing the security conditions of the actor on the target runtime environment 200b and where the target runtime environment 200b enforces its security conditions on the actor.

Figure 1B:
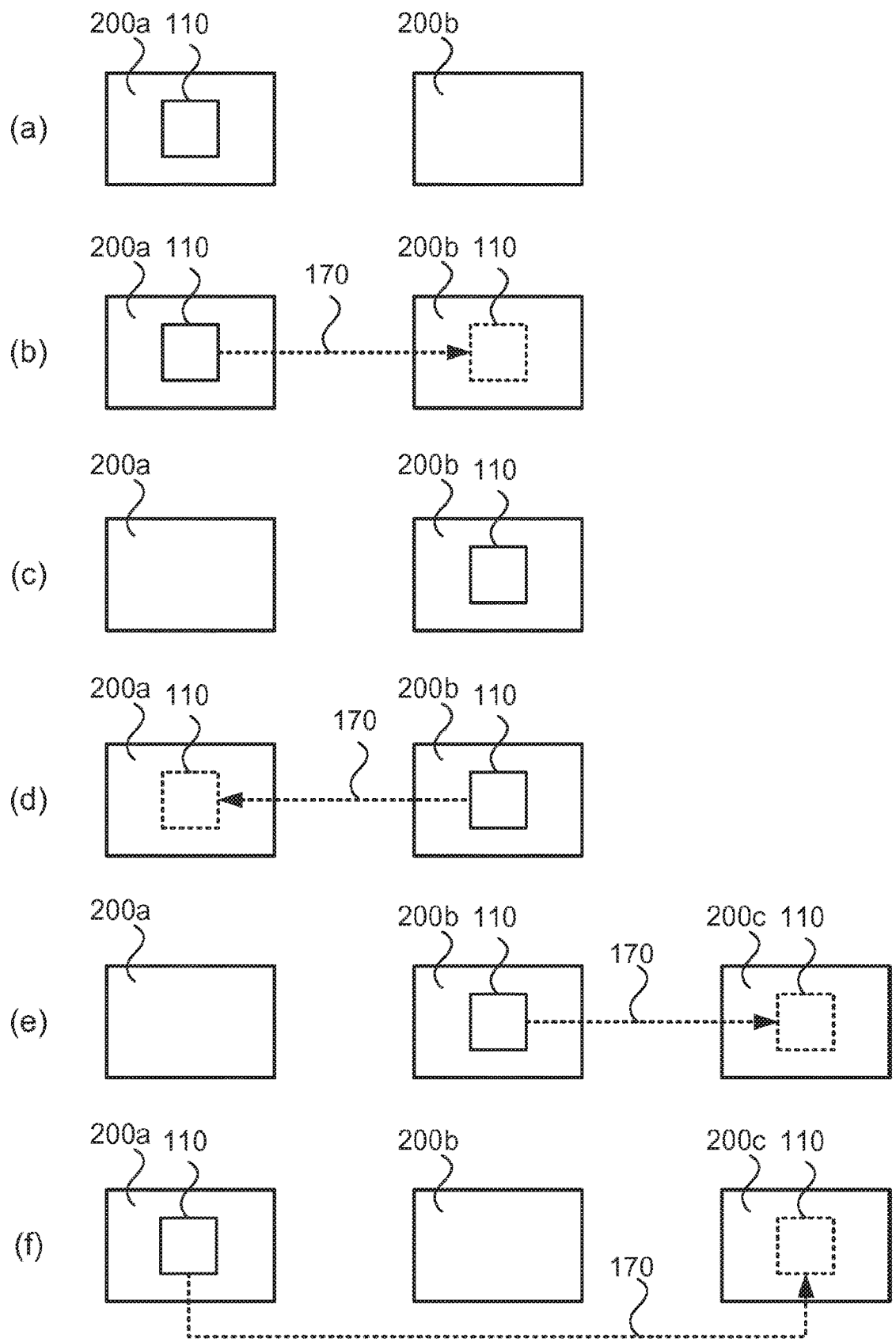
FIG. 1b is a schematic diagram illustrating migration of an instance of an actor according to embodiments.

Parallel reference is throughout made to FIG. 1b. In FIG. 1b at (a) is illustrated an initiating runtime environment 200a and a target runtime environment 200b and where the initiating runtime environment 200a holds the instance 110 of an actor of an application.

Reference is now made to FIG. 4 illustrating a method for migrating an instance 110 of an actor of an application as performed by the runtime environment 200a acting as an initiating runtime environment according to an embodiment.

S106: The initiating runtime environment 200a selects a target runtime environment 200b from a set of target runtime environments 200b, 200c for migration of the instance 110 of the actor. The target runtime environment 200 is selected based on obtained security attributes for the set of target runtime environments 200b, 200c. Examples of how to obtain such security attributes will be disclosed below. In FIG. 1b at (b) is illustrated an initiating runtime environment 200a and a target runtime environment 200b and where the initiating runtime environment 200a has selected the target runtime environment 200b for migration (as indicated by arrow 170) of the instance 110 of the actor.

S108: The initiating runtime environment 200a migrates the instance 110 of the actor to the selected target runtime environment 200b once having selected the target runtime environment 200b. In FIG. 1b at (c) is illustrated an initiating runtime environment 200a and a target runtime environment 200b and where the instance 110 of the actor has been migrated to the target runtime environment 200b.

Embodiments relating to further details of migrating the instance 110 of an actor of an application as performed by the initiating runtime environment 200a will now be disclosed.

The security attributes could be obtained in a distributed or central manner. Hence, according to an embodiment the (respective) security attributes of at least one of the target runtime environments 200b, 200c in the set of target runtime environments 200b, 200c is obtained directly from the at least one of the target runtime environments 200b, 200c. According to another embodiment the security attributes of at least one of the target runtime environments 200b, 200c in the set of target runtime environments 200b, 200c is obtained from a security attribute service. There can be different examples of security attributes services. For example, a security attributes service could be a service configured to manage (at least one of create, provide, verify, and revoke) security attributes for runtime environments 200a, 200b, 200c, a central service that stores security attributes of at least one runtime environment 200a, 200b, 200c, and/or a distributed service that stores security attributes of at least one runtime environment 200a, 200b, 200c.

There can be different examples of security attributes. For example, the security attributes could comprises user authentication information, authorization policy, authorized credentials, information of availability of secure personal identification number (PIN) code, information of availability of a secure user interface, and/or information of availability of a secure boot.

Reference is now made to FIG. 5 illustrating methods for migrating an instance 110 of an actor of an application as performed by the runtime environment 200a acting as an initiating runtime environment according to further embodiments. It is assumed that steps S106 and S108 are performed as disclosed with reference to FIG. 4.

There may be different ways for the initiating runtime environment 200a to select the target runtime environment 200b. Different embodiments relating thereto will now be described in turn.

For example, the initiating runtime environment 200a can request information about security attributes. Hence, according to an embodiment the initiating runtime environment 200a is configured to perform step S106a as part of the selection of target runtime environment 200b:

S106a: The initiating runtime environment 200a obtains the security attributes for the set of target runtime environments 200b, 200c. Step S106a can be performed as part of above step S106. The initiating runtime environment 200a that starts the migration can thus first request information about security attributes and then select a first potential target runtime environment 200b.

For example, the initiating runtime environment 200a can verify that the target runtime environment 200b fulfills the security attribute conditions. Hence, according to an embodiment the initiating runtime environment 200a is configured to perform step S106b as part of the selection of target runtime environment 200b:

S106b: The initiating runtime environment 200a verifies that the obtained security attributes for the selected target runtime environment 200b fulfil security attribute conditions of the instance 110 of the actor. Step S106b can be performed as part of above step S106.

For example, the initiating runtime environment 200a can verify that the target runtime environment 200b fulfills the security attribute conditions by interacting with the target runtime environment 200b. Such a verification can be made by the initiating runtime environment 200a communicating a challenge to the target runtime environment 200b, where the target runtime environment 200b, using other private security attributes, derives a response to the challenge and returns the response to the initiating runtime environment 200a. Hence, according to an embodiment the initiating runtime environment 200a is configured to perform step S106d as part of the selection of target runtime environment 200b:

S106c: The initiating runtime environment 200a verifies that the obtained security attributes for the selected target runtime environment 200b are rightfully identified by the target runtime environment 200b. Step S106d can be performed as part of above step S106.

For example, the initiating runtime environment 200a can perform a partial check if the target runtime environment 200b could accept the actor before the instance 110 of the actor is migrated to the target runtime environment 200b. Hence, according to an embodiment the initiating runtime environment 200a is configured to perform step S106d as part of the selection of target runtime environment 200b:

S106d: The initiating runtime environment 200a verifies that the target runtime environment 200b will accept initiation of migration of the instance 110 of the actor to the target runtime environment 200b before initiating migration of the instance 110 of the actor to the selected target runtime environment 200b. This could increase the chance of a successful migration. Step S106d can be performed as part of above step S106.

There may be different ways for the initiating runtime environment 200a to migrate the instance 110 of the actor to the target runtime environment 200b. For example, the initiating runtime environment 200a can provide data necessary to (re-)instantiate the instance 110 of the actor to the target runtime environment 200b. Hence, according to an embodiment the initiating runtime environment 200a is configured to perform step S108a as part of the migration of the instance 110 of the actor to the target runtime environment 200b:

S108a: The initiating runtime environment 200a provides data necessary to instantiate the instance 110 of the actor to the selected target runtime environment 200b. Step S108a can be performed as part of above step S108.

The migration could be a result of the instance 110 of the actor previously having been rejected by other target runtime environment 200b. Hence, according to an embodiment the selecting of the target runtime environment 200b in step S106 is performed in response to migrating of the instance no of the actor to another target runtime environment 200c having been unsuccessful.

Likewise, the migration could be a result of the instance 110 of the actor previously having been pushed to initiating runtime 200a but where the instance 110 of the actor is not allowed access by the initiating runtime 200a. Hence, according to an embodiment the initiating runtime environment 200a is configured to perform steps S102 and S104:

S102: The initiating runtime environment 200a obtains the instance 110 of the actor as migration of the instance 110 of the actor from another initiating runtime environment 200c. Upon having obtained the instance 110 of the actor the initiating runtime environment 200a performs step S104:

S104: The initiating runtime environment 200a determines that an authorization policy of the initiating runtime environment 200a for the instance 110 of the actor is not fulfilled. The selecting of the target runtime environment in step S106 is then performed in response thereto. Hence, steps S102 and S104 are performed before step S106 for the same instance 110 of the actor.

Reference is now made to FIG. 6 illustrating a method for migrating an instance 110 of an actor of an application as performed by the runtime environment 200b acting as a target runtime environment according to an embodiment.

S202: The target runtime environment 200b identifies security attributes that enable an initiating runtime environment 200a to select the target runtime environment 200b for migration of the instance 110 of the actor.

S204: The target runtime environment 200b obtains data necessary to instantiate the instance 110 of the actor from the initiating runtime environment 200a. The obtained data is based on the identified security attributes.

S206: The target runtime environment 200b instantiates the instance 110 of the actor when an authorization policy of the target runtime environment 200b for the instance 110 of the actor is fulfilled. The target runtime environment 200b thereby allows the instance 110 of the actor access to at least one resource object 160.

Embodiments relating to further details of migrating the instance 110 of an actor of an application as performed by the target runtime environment 200b will now be disclosed.

There could be different examples of authorization policies. According to an example, the authorization policy defines which actor, which of the at least one resource object 160, and which operation attributes that need to be fulfilled for the actor to access the at least one resource object 160 of the target runtime environment 200b.

There could be different examples of resource objects 160. Each resource object 160 could be an interface representing a resource such as a sensor, actuator, processing, camera, network interface, message service, storage, database, face recognition service/module, pattern matching service/module, analytics service/module, solver service/module, etc.

Reference is now made to FIG. 7 illustrating methods for migrating an instance 110 of an actor of an application as performed by the runtime environment 200b acting as a target runtime environment according to further embodiments. It is assumed that steps S202, S204, and S206 are performed as disclosed with reference to FIG. 6.

As disclosed above, in step S206, the target runtime environment 200b instantiates the instance 110 of the actor when an authorization policy of the target runtime environment 200b for the instance 110 of the actor is fulfilled. There may be different ways for the target runtime environment 200b to determine whether the authorization policy of the target runtime environment 200b for the instance 110 of the actor is fulfilled or not. Different embodiments relating thereto will now be described in turn.

For example, if required by the authorization policy, the target runtime environment 200b can verify that the instance 110 of the actor is authentic. In order to do so, the target runtime environment 200b is, according to an embodiment, configured to perform step S206a:

S206a: The target runtime environment 200b verifies, according to the authorization policy, authenticity of the data necessary to instantiate the instance 110 of the actor. Step S206a can be performed as part of above step S206. In order to do so, the target runtime environment 200b can check if the data necessary to instantiate the instance 110 of the actor is signed with credentials that the target runtime environment 200b accepts.

For example, if requested by the target runtime environment 200b, the actor is challenged to prove the rightful ownership of the required attributes. In order to do so, the target runtime environment 200b is, according to an embodiment, configured to perform step S206b:

S206b: The target runtime environment 200b verifies ownership of required attributes from the data necessary to instantiate the instance 110 of the actor. Step S206b can be performed as part of above step S206.

The verifying on step S206b may involve interaction with the initiating runtime environment 200a or actors of the same application residing on the initiating runtime environment 200a responsible for protection and authentication of the entities credentials. In order to do so, the target runtime environment 200b is, according to an embodiment, configured to perform step S206c:

S206c: The target runtime environment 200b performs authentication verification with the instantiating runtime environment 200a. Step S206c can be performed as part of above step S206. A challenge could e.g. be an entity authenticating and signing a challenge and returning a response. One non-limiting example of such an authentication verification is cryptographic challenge-response authentication which thus may be performed between the target runtime environment 200b and the instantiating runtime environment 200a.

If any security condition verification fails the actor can be blocked from execution on the target runtime environment 200b and either the initiating runtime environment 200a or the target runtime environment 200b will initiate a new attempt for migrating the instance 110 of the actor to a new target runtime environment 200c, see below.

Hence, according to an embodiment the instance 110 of the actor is blocked from execution on the target runtime environment 200b when any of the verifying; steps S206a, S206b, S206c fails.

Further, access to a resource object 160 could be blocked when an authorization policy is not fulfilled. Hence, according to an embodiment the target runtime environment 200b is configured to perform step S208:

S208: The target runtime environment 200b prevents the instance 110 of the actor from accessing the at least one resource object 160 when the authorization policy is not fulfilled. Step S208 can be performed after step S206.

There may be different ways for the target runtime environment 200b to act once a failed migration of the instance 110 of the actor has occurred and/or when the instance 110 of the actor has been prevented from accessing the at least one resource object 160. According to an embodiment the target runtime environment 200b informs the initiating runtime environment 200a of the failed migration/blocking and hence performs step S210:

S210: The target runtime environment 200b notifies the initiating runtime environment 200a of unsuccessful migration of the instance 110 of the actor in response to having blocked the instance 110 of the actor from execution or having prevented the instance 110 of the actor from accessing the at least one resource object 160. Step S210 can be performed after step S208. In FIG. 1b at (d) is illustrated an initiating runtime environment 200a and a target runtime environment 200b and where the target runtime environment 200b has notified (as indicated by arrow 170) the initiating runtime environment 200a of unsuccessful migration of the instance 110 of the actor.

According to an embodiment the target runtime environment 200b initiates a migration attempt of the instance 110 of the actor for a new target runtime environment 200c and hence performs steps S212 and S214:

S212: The target runtime environment 200b selects, based on obtained security attributes for a set of other target runtime environments 200c, another target runtime environment 200c from the set of target runtime environments 200c for migration of the instance 110 of the actor. In FIG. 1b at (e) is illustrated an initiating runtime environment 200a, a target runtime environment 200b, and another target runtime environment 200c and where the target runtime environment 200b has selected this another target runtime environment 200c for (yet further) migration (as indicated by arrow 170) of the instance 110 of the actor.

S214: The target runtime environment 200b migrates S214 the instance 110 of the actor to the selected another target runtime environment 200c once having selected this another target runtime environment 200c in response to having blocked the instance 110 of the actor from execution.

Steps S212 and S214 are thus similar to steps S106 and S108 as disclosed above but steps S212 and S214 are thus performed by the target runtime environment 200b with another target runtime environment 200c as selected target runtime environment. As is understood by persons skilled in the art the target runtime environment 200b may not have instantiated the actor from the obtained data necessary to instantiate the actor and hence may migrate the instance of the actor 110 directly with the obtained data necessary to instantiate the actor.

In general terms, if the target runtime environment 200b rejects the instance 110 of the actor being migrated either the target runtime environment 200b or the initiating runtime environment 200c can initiate a new migration of the instance 110 of the actor towards a new target runtime environment 200c. For example, the initiating runtime environment 200a can then repeat or reuse results from previous information gathering and select another target runtime environment 200b to become the target runtime environment of the instance 110 of the actor and redo the migration attempt. In FIG. 1b at (f) is illustrated an initiating runtime environment 200a, a target runtime environment 200b, and another target runtime environment 200c and where the initiating runtime environment 200a has selected the another target runtime environment 200c for migration (as indicated by arrow 170) of the instance 110 of the actor.

As disclosed above, the initiating runtime environment 200a selects the target runtime environment 200b based on obtained security attributes. In order to do so the initiating runtime environment 200a may enforce that a policy of the target runtime environment 200b is combined with deployment credentials and runtime environment credentials so that the requirements on the target runtime environment 200b are fulfilled before the instance 110 of the actor is migrated to the target runtime environment 200b. Examples of such requirements are security capabilities, security assurance (such as attestation of a secure boot), and that the runtime environment ownership has a known trusted party.

A trust relationship between the initiating runtime environment 200a and the target runtime environment 200b can be established via a Public Key Infrastructure (PKI), i.e., where certificate structures express a way to trust another runtime environment. Each runtime environment 200a, 200b may share a common Certificate Authority (CA), or trust between CAs may have been established via cross certification. Using such a PKI, the runtime environments 200a, 200b can authenticate each other, such as in above step S106c, establish shared cryptographic keys and securely communicate, e.g., via the Transport Layer Security (TLS) protocol, the Datagram Transport Layer Security (DTLS) protocol or using an object security protocol.

Application attributes may require that such a trust relationship can be established, but may also require the target runtime environment 200b to have a specific CA, or even being a member of a set of specified devices. Other security attributes, as mentioned above, are secure computing attributes; the instance 110 of the application may require verifiable attestation proof that the target runtime environment 200b has performed a secure measured boot. The availability of a Trusted Execution Environment, Trusted Platform Module, smart card, support for Trusted User Input and Output, secure video/audio path are other examples of attributes that can be used.

When the initiating runtime environment 200a deems that requirements on the target runtime environment 200b are fulfilled the initiating runtime environment 200a will migrate the instance 110 of the actor to the target runtime environment 200b. The target runtime environment 200b enforces that its actor policy and access policy in combination with credentials are fulfilled by the migrated instance 110 of the actor. Examples of such requirements are user authentication and authorization, requirements on signed code, but can also be attributes related to operations and the environment in which the instance 110 of the actor will be executed, e.g., time of day. A security policy describes what attributes of the subject, resource object 160, environment and operations must be fulfilled to allow the instance 110 of the actor to perform requested operations on resource objects 160 provided by the target runtime environment 200b. In this respect, a subject is a computerized representation of the entity responsible for running the application, commonly a user or an organization. Subject attributes are used to describe the user identity. An identity may be associated with access privileges to runtime environment resources; it may be in the form of username, group and role memberships, but also possession of cryptographic keys or passwords. For example, it may be sufficient for a runtime environment 200a, 200b, 200c to ensure that the instance 110 of the actor is associated with cryptographic keys whose possession can be proven via a cryptographic challenge response procedure or a zero-knowledge proof protocol, see above. A policy may list requirements on identification and authentication of users, resources accessible to users, and requirements on entities allowed to sign actors and applications.

Figure 2A:
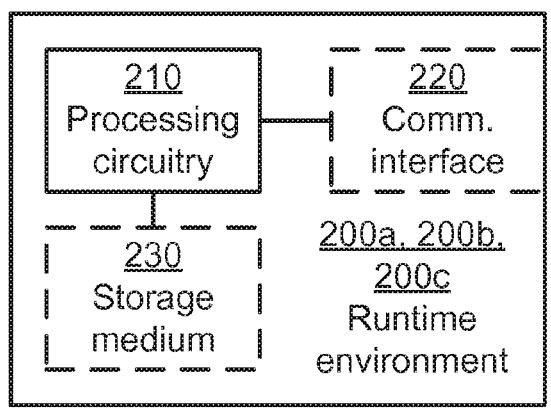
FIG. 2a is a schematic diagram showing functional units of a runtime environment according to an embodiment.

FIG. 2a schematically illustrates, in terms of a number of functional units, the components of a runtime environment 200a, 200b, 200c according to an embodiment. According to aspects, the runtime environment 200a, 200b, 200c is configured to act as both an initiating runtime environment 200a and a target runtime environment 200b Processing circuitry 210 is provided using any combination of one or more of a suitable central processing unit (CPU), multiprocessor, microcontroller, digital signal processor (DSP), etc., capable of executing software instructions stored in a computer program product 310a (as in FIG. 4), e.g. in the form of a storage medium 230. The processing circuitry 210 may further be provided as at least one application specific integrated circuit (ASIC), or field programmable gate array (FPGA).

Particularly, the processing circuitry 210 is configured to cause the runtime environment 200a, 200b, 200c to perform a set of operations, or steps, S102-S108, S202-S214, as disclosed above. For example, the storage medium 230 may store the set of operations, and the processing circuitry 210 may be configured to retrieve the set of operations from the storage medium 230 to cause the runtime environment 200a, 200b, 200c to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The runtime environment 200a, 200b, 200c may further comprise a communications interface 220 for communicating at least with another runtime environment 200a, 200b, 200c. As such the communications interface 220 may comprise one or more transmitters and receivers, comprising analogue and digital components and a suitable number of antennas for wireless communications and ports for wireline communications.

The processing circuitry 210 controls the general operation of the runtime environment 200a, 200b, 200c e.g. by sending data and control signals to the communications interface 220 and the storage medium 230, by receiving data and reports from the communications interface 220, and by retrieving data and instructions from the storage medium 230. Other components, as well as the related functionality, of the runtime environment 200a, 200b, 200c are omitted in order not to obscure the concepts presented herein.

Figure 2B:
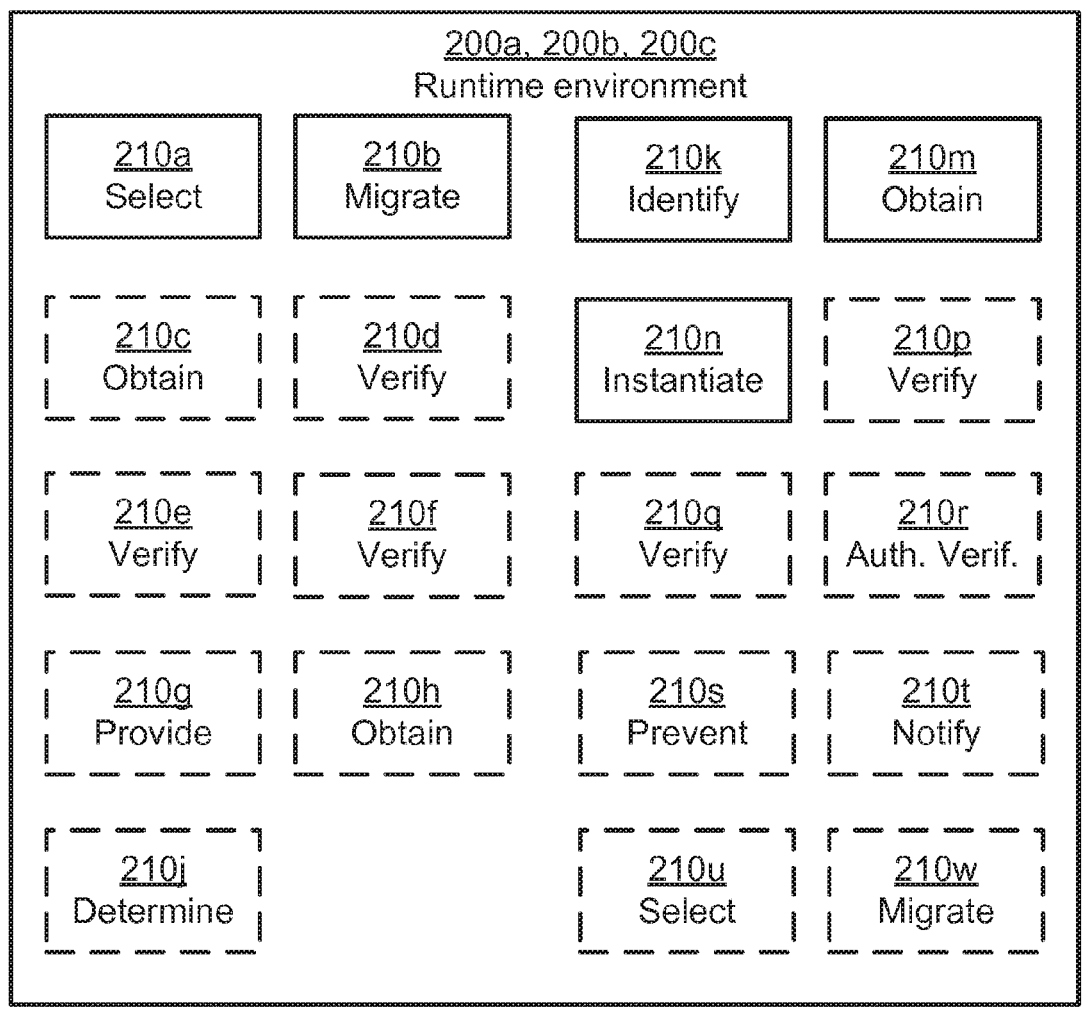
FIG. 2b is a schematic diagram showing functional modules of a runtime environment according to an embodiment.

FIG. 2b schematically illustrates, in terms of a number of functional modules, the components of a runtime environment 200a, 200b, 200c according to an embodiment. The runtime environment 200a, 200b, 200c of FIG. 2b comprises a number of functional modules.

In order for the runtime environment to act as an initiating runtime environment 200a the runtime environment comprises a select module 210a configured to perform step S106, and a migrate module 210b configured to perform step S108. The runtime environment of FIG. 2b acting as an initiating runtime environment 200a may further comprise a number of optional functional modules, such as any of an obtain module 210c configured to perform step S106a, a verify module 210d configured to perform step S106b, a verify module 210e configured to perform step S106c, a verify module 210f configured to perform step S106d, a provide module 210g configured to perform step S108a, and obtain module 210h configured to perform step S102, and determine module 210j configured to perform step S104.

In order for the runtime environment to act as a target runtime environment 200b the runtime environment comprises an identify module 210k configured to perform step S202, an obtain module 210m configured to perform step S204, and an instantiate module 210n configured to perform step S206. The runtime environment of FIG. 2b acting as a target runtime environment 200b may further comprise a number of optional functional modules, such as any of a verify module 210p configured to perform step S206a, a verify module 210q configured to perform step S206b, an authentication verification module 210r configured to perform step S206c, a prevent module 210s configured to perform step S208, a notify module 210t configured to perform step S210, a select module 210u configured to perform step S212, and a migrate module 210w configured to perform step S214.

In general terms, each functional module 210a-210w may be implemented in hardware or in software. Preferably, one or more or all functional modules 210a-210w may be implemented by the processing circuitry 210, possibly in cooperation with functional units 220 and/or 230. The processing circuitry 210 may thus be arranged to from the storage medium 230 fetch instructions as provided by a functional module 210a-210w and to execute these instructions, thereby performing any steps as be disclosed hereinafter.

Figure 3:
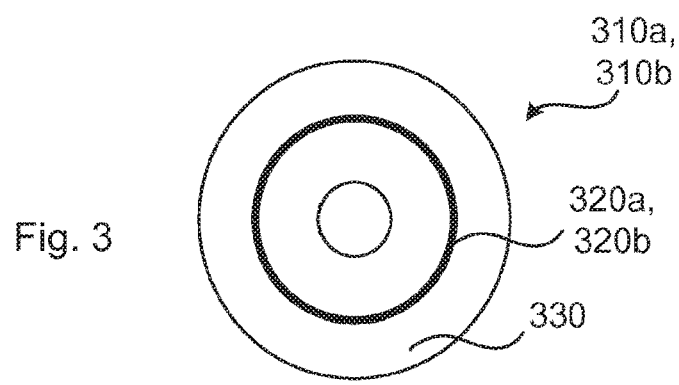
FIG. 3 shows one example of a computer program product comprising computer readable means according to an embodiment.

FIG. 3 shows one example of a computer program product 310a, 310b comprising computer readable means 330. On this computer readable means 330, a computer program 320a can be stored, which computer program 320a can cause the processing circuitry 210 and thereto operatively coupled entities and devices, such as the communications interface 220 and the storage medium 230, to execute methods according to embodiments described herein. The computer program 320a and/or computer program product 310a may thus provide means for performing any steps of the runtime environment 200a acting as an initiating runtime environment as herein disclosed. On this computer readable means 330, a computer program 320b can be stored, which computer program 320b can cause the processing circuitry 310 and thereto operatively coupled entities and devices, such as the communications interface 320 and the storage medium 330, to execute methods according to embodiments described herein. The computer program 320b and/or computer program product 310b may thus provide means for performing any steps of the runtime environment 200b acting as a target runtime environment as herein disclosed.

In the example of FIG. 3, the computer program product 310a, 310b is illustrated as an optical disc, such as a CD (compact disc) or a DVD (digital versatile disc) or a Blu-Ray disc. The computer program product 310a, 310b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320a, 320b is here schematically shown as a track on the depicted optical disk, the computer program 320a, 320b can be stored in any way which is suitable for the computer program product 310a, 310b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for migrating an instance of an actor of an application running in an initiating runtime environment, the method being performed by a target runtime environment, the method comprising:
identifying security attributes that enable the initiating runtime environment to select the target runtime environment for migration of the instance of the actor;
receiving a challenge from the initiating runtime environment;
using the identified security attributes to produce a response to the challenge;
communicating the response to the challenge to the initiating runtime environment;
obtaining data necessary to instantiate the instance of the actor from the initiating runtime environment based on the identified security attributes; and
instantiating the instance of the actor when an authorization policy of the target runtime environment for the instance of the actor is fulfilled, thereby allowing the instance of the actor access to at least one resource object.

2. The method according to claim 1, wherein instantiating the instance of the actor access comprises:
verifying, according to the authorization policy, authenticity of the data necessary to instantiate the instance of the actor.

3. The method according to claim 2, wherein the instance of the actor is blocked from execution on the target runtime environment when any of the verifying fails.

4. The method according to claim 1, further comprising:
preventing the instance of the actor from accessing the at least one resource object when the authorization policy is not fulfilled.

5. The method according to claim 3, further comprising:
notifying the initiating runtime environment of unsuccessful migration of the instance of the actor in response to having blocked the instance of the actor from execution or having prevented the instance of the actor from accessing the at least one resource object.

6. The method according to claim 3, further comprising:
selecting, based on obtained security attributes for a set of other target runtime environments, another target runtime environment from the set of target runtime environments for migration of the instance of the actor; and
migrating the instance of the actor to the selected another target runtime environment once having selected the another target runtime environment in response to having blocked the instance of the actor from execution.

7. The method according to claim 1, wherein the authorization policy defines which actor, which of the at least one resource object, and which operation attributes that need to be fulfilled for the actor to access the at least one resource object of the target runtime environment.

8. The method of claim 1, further comprising providing the identified security attributes directly to the initiating runtime environment.

9. A runtime environment acting as a target runtime environment for migrating an instance of an actor of an application running in an initiating runtime environment, the runtime environment comprising processing circuitry, the processing circuitry being configured to cause the runtime environment to:
- identify security attributes that enable a runtime environment acting as the initiating runtime environment to select the target runtime environment for migration of the instance of the actor;
- receive a challenge from the initiating runtime environment;
- use the identified security attributes to produce a response to the challenge;
- communicate the response to the challenge to the initiating runtime environment;
- obtain data necessary to instantiate the instance of the actor from the runtime environment acting as initiating runtime environment based on the identified security attributes; and
- instantiate the instance of the actor when an authorization policy of the runtime environment acting as target runtime environment for the instance of the actor is fulfilled, thereby allowing the instance of the actor access to at least one resource object.

10. The runtime environment of claim 9, wherein the processing circuitry is further configured to cause the runtime environment to provide the identified security attributes directly to the initiating runtime environment.

11. A runtime environment acting as a target runtime environment for migrating an instance of an actor of an application running in an initiating runtime environment, the runtime environment comprising:
- an identify module configured to identify security attributes that enable a runtime environment acting as the initiating runtime environment to select the target runtime environment for migration of the instance of the actor;
- a receive module configured to receive a challenge from the initiating runtime environment;
- a response module configured to use the identified security attributes to produce a response to the challenge;
- a communication module configured to communicate the response to the challenge to the initiating runtime environment;
- an obtain module configured to obtain data necessary to instantiate the instance of the actor from the runtime environment acting as initiating runtime environment based on the identified security attributes; and
- an instantiate module configured to instantiate the instance of the actor when an authorization policy of the runtime environment acting as target runtime environment for the instance of the actor is fulfilled, thereby allowing the instance of the actor access to at least one resource object.

12. The runtime environment of claim 11, further comprising a provide module configured to provide the identified security attributes directly to the initiating runtime environment.

13. A non-transitory computer readable storage medium comprising a computer program for migrating an instance of an actor of an application running in an initiating runtime environment, the computer program comprising computer code which, when run on processing circuitry of a runtime environment acting as a target runtime environment, causes the runtime environment to:
- identify security attributes that enable a runtime environment acting as the initiating runtime environment to select the runtime environment acting as the target runtime environment for migration of the instance of the actor;
- receive a challenge from the initiating runtime environment;
- use the identified security attributes to produce a response to the challenge;
- communicate the response to the challenge to the initiating runtime environment;
- obtain data necessary to instantiate the instance of the actor from the runtime environment acting as initiating runtime environment based on the identified security attributes; and
- instantiate the instance of the actor when an authorization policy of the runtime environment acting as target runtime environment for the instance of the actor is fulfilled, thereby allowing the instance of the actor access to at least one resource object.

14. The non-transitory computer readable storage medium of claim 13, wherein the method further comprises providing the identified security attributes directly to the initiating runtime environment.

* * * * *

UNITED STATES PATENT AND TRADEMARK OFFICE
CERTIFICATE OF CORRECTION

PATENT NO. : 11,687,673 B2
APPLICATION NO. : 16/940828
DATED : June 27, 2023
INVENTOR(S) : Gustafsson et al.

It is certified that error appears in the above-identified patent and that said Letters Patent is hereby corrected as shown below:

In the Specification

In Column 4, Line 58, delete "AG" and insert -- A6 --, therefor.

In Column 7, Line 39, delete "S106d" and insert -- S106c --, therefor.

In Column 8, Line 13, delete "no" and insert -- 110 --, therefor.

In Column 9, Line 64, delete "verifying," and insert -- verifying --, therefor.

In Column 10, Line 29, delete "2000" and insert -- 200c --, therefor.

In Column 13, Line 32, delete "as" and insert -- as will --, therefor.

Signed and Sealed this
Seventh Day of November, 2023

Katherine Kelly Vidal
*Director of the United States Patent and Trademark Office*